(12) United States Patent
Yokoyama et al.

(10) Patent No.: US 11,998,874 B2
(45) Date of Patent: *Jun. 4, 2024

(54) METALLIC BASE MATERIAL FOR EXHAUST PURGING, AND EXHAUST PURGING DEVICE USING SAME

(71) Applicant: CATALER CORPORATION, Kakegawa (JP)

(72) Inventors: Naoki Yokoyama, Kakegawa (JP); Akio Kubota, Kakegawa (JP); Nobuaki Bando, Kakegawa (JP); Chihiro Kasuya, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 470 days.

This patent is subject to a terminal disclaimer.

(21) Appl. No.: 17/419,583

(22) PCT Filed: Feb. 5, 2020

(86) PCT No.: PCT/JP2020/004422
§ 371 (c)(1),
(2) Date: Jun. 29, 2021

(87) PCT Pub. No.: WO2020/162510
PCT Pub. Date: Aug. 13, 2020

(65) Prior Publication Data
US 2022/0080354 A1    Mar. 17, 2022

(30) Foreign Application Priority Data
Feb. 5, 2019    (JP) ................................. 2019-019151

(51) Int. Cl.
*B01J 23/63*    (2006.01)
*B01D 53/94*    (2006.01)
(Continued)

(52) U.S. Cl.
CPC ........... *B01D 53/94* (2013.01); *F01N 3/2817* (2013.01); *F01N 3/2821* (2013.01);
(Continued)

(58) Field of Classification Search
CPC ......... B01J 23/63; B01J 35/04; F01N 3/2817; F01N 3/2821; B01D 53/94
See application file for complete search history.

(56) References Cited

U.S. PATENT DOCUMENTS 4,186,172 A * 1/1980 Scholz .................. F01N 3/2842
60/299
4,239,834 A * 12/1980 Cunningham ........... B01J 35/04
428/592
(Continued)

FOREIGN PATENT DOCUMENTS

DE          42 10 784 A1    10/1993
DE    10 2004 015 027 A1    10/2005
(Continued)

OTHER PUBLICATIONS

Apr. 7, 2020 International Search Report issued in International Patent Application No. PCT/JP2020/004422.
(Continued)

*Primary Examiner* — Cam N. Nguyen
(74) *Attorney, Agent, or Firm* — Oliff PLC (57) ABSTRACT

A perforated metallic base material for purging exhaust is obtained by laminating a wavy foil having pores and a flat foil having pores and forming the same into a cylindrical shape, wherein the wavy foil and/or the flat foil has axially perforated portions having pores throughout the axial direction of the cylindrical shape and axially non-perforated portions not having pores overall in the axial direction of the cylindrical form.

15 Claims, 7 Drawing Sheets

(51) Int. Cl.
*B01J 35/04* (2006.01)
*F01N 3/28* (2006.01)

(52) U.S. Cl.
CPC ............... *B01D 2255/1021* (2013.01); *B01D 2255/1023* (2013.01); *B01D 2255/1025* (2013.01); *F01N 2330/04* (2013.01); *F01N 2330/38* (2013.01)

(56) References Cited

U.S. PATENT DOCUMENTS

| | | | | |
|---|---|---|---|---|
| 4,318,888 | A * | 3/1982 | Chapman | F01N 3/2814 428/116 |
| 4,382,323 | A * | 5/1983 | Chapman | B01D 53/86 29/890 |
| 4,711,009 | A * | 12/1987 | Cornelison | B01J 37/0225 428/116 |
| 4,829,655 | A * | 5/1989 | Cornelison | B01J 27/24 29/527.4 |
| 5,514,347 | A * | 5/1996 | Ohashi | F01N 3/027 422/174 |
| 5,591,691 | A * | 1/1997 | Friedman | B01J 37/0244 502/355 |
| 5,604,174 | A * | 2/1997 | Friedman | B01J 37/0225 502/355 |
| 5,618,498 | A * | 4/1997 | Konya | F01N 3/2026 422/177 |
| 5,648,050 | A | 7/1997 | Matsumoto et al. | |
| 5,665,669 | A * | 9/1997 | Yamanaka | B01J 35/04 502/527.22 |
| 5,821,194 | A * | 10/1998 | In | B01J 35/04 502/527.22 |
| 5,898,016 | A * | 4/1999 | Takei | B01J 35/04 502/527.22 |
| 6,267,932 | B1 * | 7/2001 | Nilsson | B01J 35/04 422/177 |
| 6,524,563 | B1 * | 2/2003 | Wire | A61K 8/0241 424/70.28 |
| 7,083,860 | B2 * | 8/2006 | Maus | B01J 35/04 502/527.22 |
| 7,981,498 | B2 * | 7/2011 | Maus | B01J 35/04 428/116 |
| 8,337,762 | B2 * | 12/2012 | Vakkilainen | B01J 37/0246 422/177 |
| 9,028,625 | B2 * | 5/2015 | Inaguma | C22C 38/005 148/531 |
| 9,381,467 | B2 * | 7/2016 | Murawaki | F01N 3/281 |
| 9,616,411 | B2 * | 4/2017 | Inaguma | C23C 2/26 |
| 9,938,146 | B2 * | 4/2018 | Lin | B01J 19/32 |
| 10,307,749 | B2 * | 6/2019 | Fowler | B01J 29/06 |
| 2005/0054526 | A1 * | 3/2005 | Steinke | B01J 35/0006 427/430.1 |
| 2005/0170957 | A1 | 8/2005 | Maus et al. | |
| 2007/0041881 | A1 * | 2/2007 | Voss | B01D 53/944 422/177 |
| 2007/0197382 | A1 * | 8/2007 | West | B01J 19/249 502/527.23 |
| 2009/0148357 | A1 * | 6/2009 | Kaneeda | F01N 3/0814 502/305 |
| 2010/0203238 | A1 * | 8/2010 | Magno | B01J 19/2485 427/156 |
| 2010/0298130 | A1 | 11/2010 | Murawaki et al. | |
| 2020/0230586 | A1 | 7/2020 | Fujimura et al. | |

FOREIGN PATENT DOCUMENTS

| | | |
|---|---|---|
| EP | 0 705 962 B1 | 12/2001 |
| JP | H05-138042 A | 6/1993 |
| JP | H05-309277 A | 11/1993 |
| JP | 2005-313082 A | 11/2005 |
| JP | 2009-178647 A | 8/2009 |
| JP | 2010-051938 A | 3/2010 |
| TW | 321246 U | 11/1997 |
| TW | 559227 U | 10/2003 |
| WO | 2004/022937 A1 | 3/2004 |
| WO | 2019/031080 A1 | 2/2019 |

OTHER PUBLICATIONS

Apr. 7, 2020 Written Opinion issued in International Patent Application No. PCT/JP2020/004422.
Sep. 22, 2022 Extended European Search Report issued in Patent Application No. 20753078.3.

* cited by examiner

METALLIC BASE MATERIAL FOR EXHAUST PURGING, AND EXHAUST PURGING DEVICE USING SAME

FIELD

The present invention relates to a metal substrate for exhaust gas purification and an exhaust gas purification device using the same. Specifically, the present invention relates to a metal substrate for exhaust gas purification having high purification performance and mechanical strength, and an exhaust gas purification device using the metal substrate.

BACKGROUND

Figure 3:
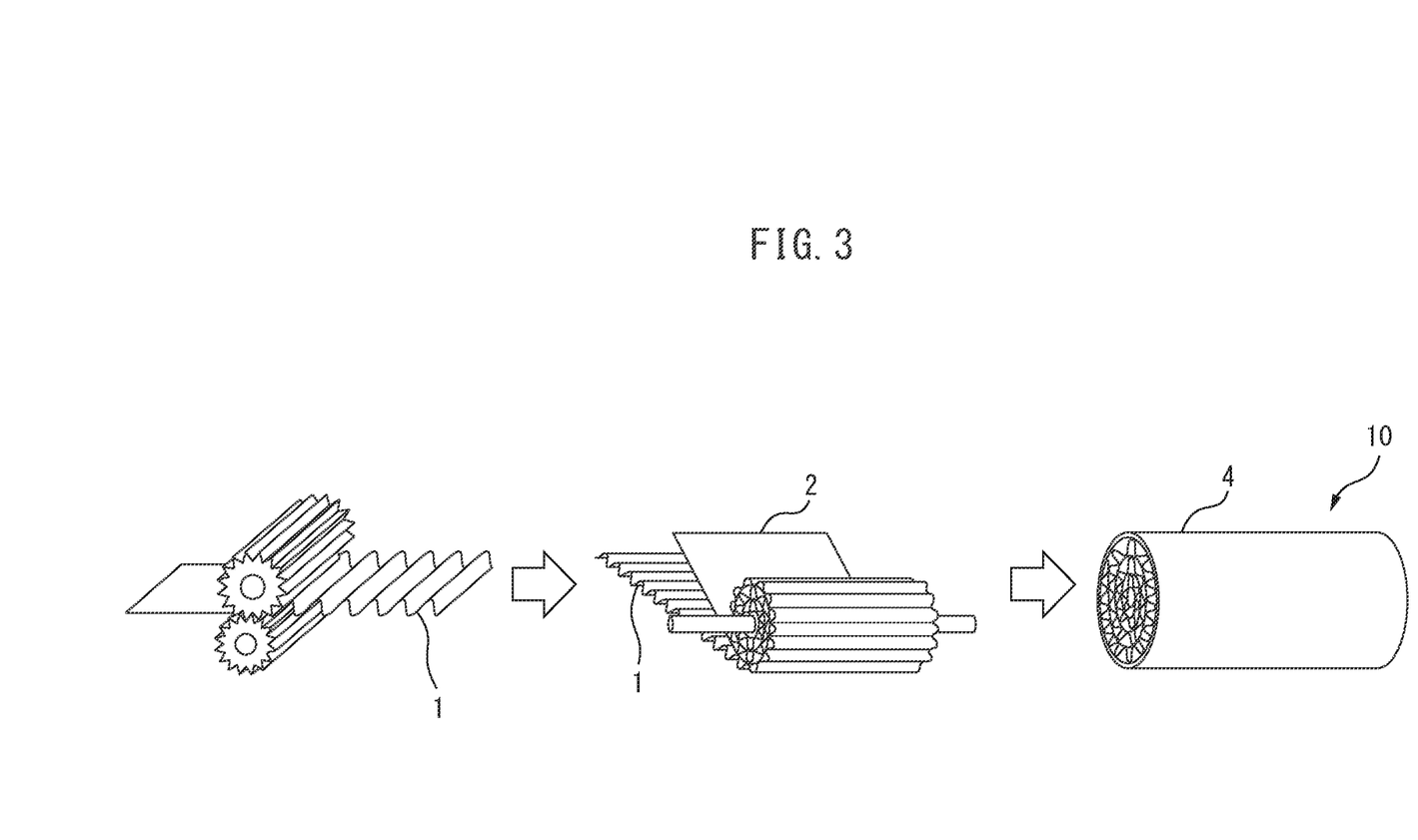
FIG. 3 is a schematic drawing showing the general manufacturing process for a metal substrate having a corrugated foil and a flat foil.

Exhaust gas purification devices using substrates made of metal (metal substrates) are widely used as exhaust gas purification devices in internal combustion engines, such as for motorcycles, power generators, and agricultural machinery. The metal substrates are generally a cylindrical body of a laminate of a corrugation-processed metal foil and a flat metal foil. For example, as shown in FIG. 3, generally, the metal foil is corrugation-processed to obtain a corrugated foil (1), and the corrugated foil (1) is rolled together with a flat foil (2), which is a flat metal foil, to make the metal substrate (10) into a cylindrical form. The cylindrical body obtained thereby can be optionally inserted into an outer cylinder (4).

Figure 4:
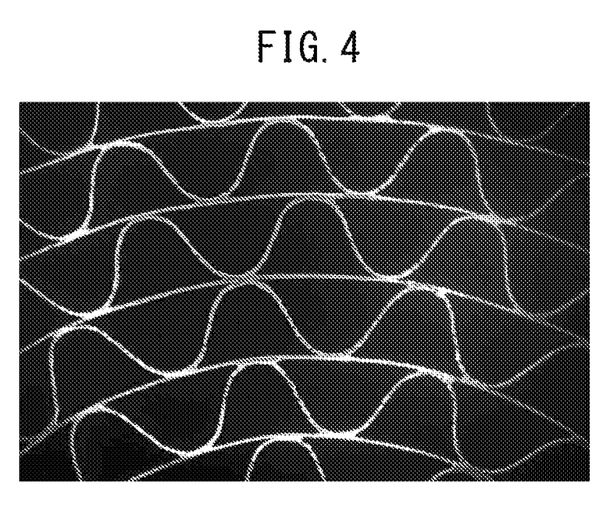
FIG. 4 is a photograph as an example of the metal substrate having a corrugated foil and a flat foil as viewed from the axial direction.

As shown in FIG. 4, when the metal substrate comprising the corrugated foil and flat foil is viewed from the axial direction of the cylindrical body, the metal substrate contains a number of cells. In an exhaust gas purification device in which a catalyst layer is formed on the metal substrate, exhaust gas passes through the cells and is purified by contacting the catalyst layer present on the wall surfaces of the cells.

PTL 1 and 2 disclose a perforated metal substrate having holes in the corrugated foil and flat foil as above, and an exhaust gas purification device using the same.

CITATION LIST

Patent Literature

[PTL 1] WO 2004/022937
[PTL 2] Japanese Unexamined Patent Publication (Kokai) No. 2009-178647

SUMMARY

Technical Problem

Exhaust gas purification devices using such perforated metal substrates have good exhaust gas purification performance at warming up because the heat capacity is smaller due to the presence of holes. Exhaust gas purification devices using perforated metal substrates exert an influence on gas flow due to the presence of holes such that high purification performance can be imparted. However, due to the presence of holes, the mechanical durability of the substrate in the axial direction is found to be insufficient.

The object of the present invention is to provide a metal substrate for exhaust gas purification having high purification performance and sufficient mechanical durability, and an exhaust gas purification device using the same.

Solution to Problem

The present inventors have discovered that the above problem could be solved by the following aspects.

<<Aspect 1>>

A perforated metal substrate for exhaust gas purification in which a corrugated foil having holes and a flat foil having holes are laminated and made into a cylindrical form, wherein
the corrugated foil and/or the flat foil comprises an axially perforated portion having holes throughout the axial direction of the cylindrical form and an axially non-perforated portion having no holes throughout the axial direction of the cylindrical form.

<<Aspect 2>>

The perforated metal substrate according to Aspect 1, wherein the axially non-perforated portion of the corrugated foil and/or the flat foil has an area ratio of 10% to 80%.

<<Aspect 3>>

The perforated metal substrate according to Aspect 1 or 2, wherein the axially perforated portion of the corrugated foil and/or the flat foil has an opening ratio of 20 to 80%.

<<Aspect 4>>

The perforated metal substrate according to any one of Aspects 1 to 3, wherein
the corrugated foil and the flat foil comprise the axially perforated portion and the axially non-perforated portion,
the axially non-perforated portion of each of the corrugated foil and the flat foil has an area ratio of 20% to 70%, and
the axially perforated portion has an opening ratio of 20 to 80%.

<<Aspect 5>>

The perforated metal substrate according to any one of Aspects 1 to 4, wherein the area ratio of the axially non-perforated portion of the corrugated foil is greater than the area ratio of the axially non-perforated portion of the flat foil.

<<Aspect 6>>

The perforated metal substrate according to any one of Aspects 1 to 5, wherein the axially non-perforated portion is present in the outermost circumference of the cylindrical form.

<<Aspect 7>>

The perforated metal substrate according to any one of Aspects 1 to 6, wherein a circumferentially non-perforated portion having no holes throughout the circumferential direction of the corrugated foil and/or the flat foil is present.

<<Aspect 8>>

The perforated metal substrate according to any one of Aspects 1 to 7, wherein
the perforated metal substrate has 50 cells/inch$^2$ to 800 cells/inch$^2$,
the corrugated foil has a plurality of first holes having an area 2.0 times to 50 times the average opening area of the cells,
the flat foil has a plurality of second holes having an area 3.0 times to 100 times the average opening area of the cells, and
the average value of the areas of the first holes of the corrugated foil is smaller than the average value of the areas of the second holes of the flat foil.

<<Aspect 9>>

The perforated metal substrate according to Aspect 8, wherein at least one of the following conditions (1) and (2) is satisfied:

(1) the total area of the first holes of the corrugated foil is 60% or greater of the total area of all holes in the corrugated foil, and (2) the total area of the second holes of the flat foil is 60% or greater of the total area of all holes in the flat foil.

<<Aspect 10>>

An exhaust gas purification device, comprising the perforated metal substrate according to any one of Aspects 1 to 9, and a catalyst layer formed on the perforated metal substrate.

<<Aspect 11>>

The exhaust gas purification device according to Aspect 10, wherein the perforated metal substrate is inserted into an outer cylinder.

BRIEF DESCRIPTION OF DRAWINGS

FIG. 2(a) schematically illustrates a flat foil used in a conventional perforated metal substrate.

FIGS. 2(b) and (c) each schematically illustrate the flat foil used in an embodiment of the perforated metal substrate of the present invention.

DESCRIPTION OF EMBODIMENTS

The perforated metal substrate for exhaust gas purification of the present invention is of a cylindrical form made by laminating a corrugated foil having holes and a flat foil having holes. The corrugated foil and/or the flat foil comprises an axially perforated portion having holes throughout the axial direction of the cylindrical form and an axially non-perforated portion having no holes throughout the axial direction of the cylindrical form.

The present inventors have discovered that exhaust gas purification devices using a conventional perforated metal substrate have insufficient mechanical strength in the axial direction of the substrate, assuming long-term use. In the exhaust gas purification device using a perforated metal substrate, a phenomenon in which deformation occurs in the axial direction was observed. This is presumably because the exhaust gas purification device continuously received high pressure exhaust gas. Such a phenomenon did not occur in an exhaust gas purification device using a non-perforated metal substrate.

Conversely, as described above, the present inventors have discovered that a perforated metal substrate having improved strength in the axial direction while maintaining high purification performance due to the perforated portion can be obtained, by partially providing non-perforated portions in strips in the axial direction of the metal substrate, wherein the strips function as "pillars". The perforated metal substrate of the present invention has sufficient long-term mechanical durability, and has a low heat capacity (i.e., high warm-up performance) and high purification performance as a perforated metal substrate, and is thus very useful.

Figure 1:
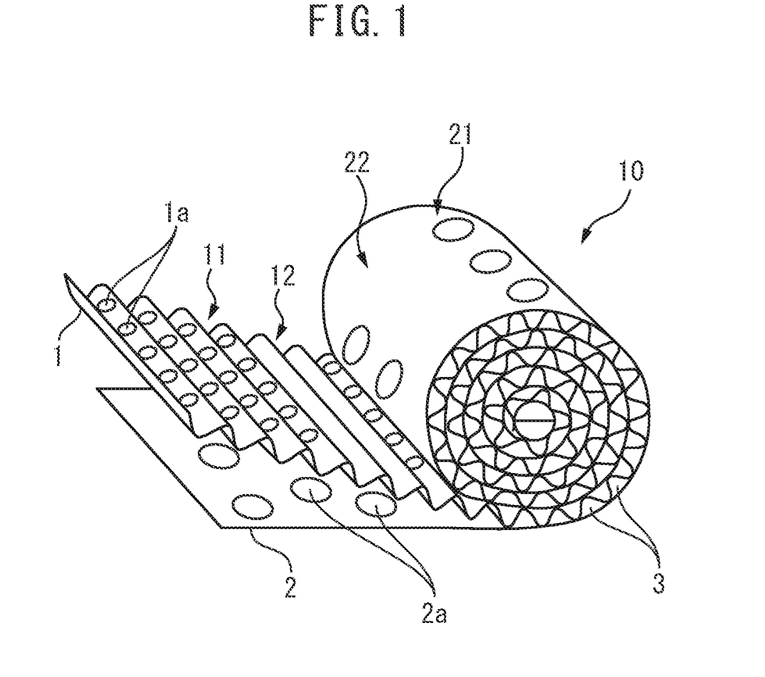
FIG. 1 schematically illustrates an embodiment of the metal substrate of the present invention.

As shown in FIG. 1, the perforated metal substrate (10) for exhaust gas purification of the present invention has a corrugated foil (1) and a flat foil (2) laminated and made into a cylindrical form, and has cells (3) formed by the corrugated foil (1) and the flat foil (2). The corrugated foil (1) has first holes (1a) and the flat foil (2) has second holes (2a). The corrugated foil (1) has axially perforated portions (11) having holes (1a) throughout the axial direction of the cylindrical form and axially non-perforated portions (12) having no holes throughout the axial direction of the cylindrical form. The flat foil (2) also has axially perforated portions (21) having holes (2a) throughout the axial direction of the cylindrical form and axially non-perforated portions (22) having no holes throughout the axial direction of the cylindrical form.

Figure 2:
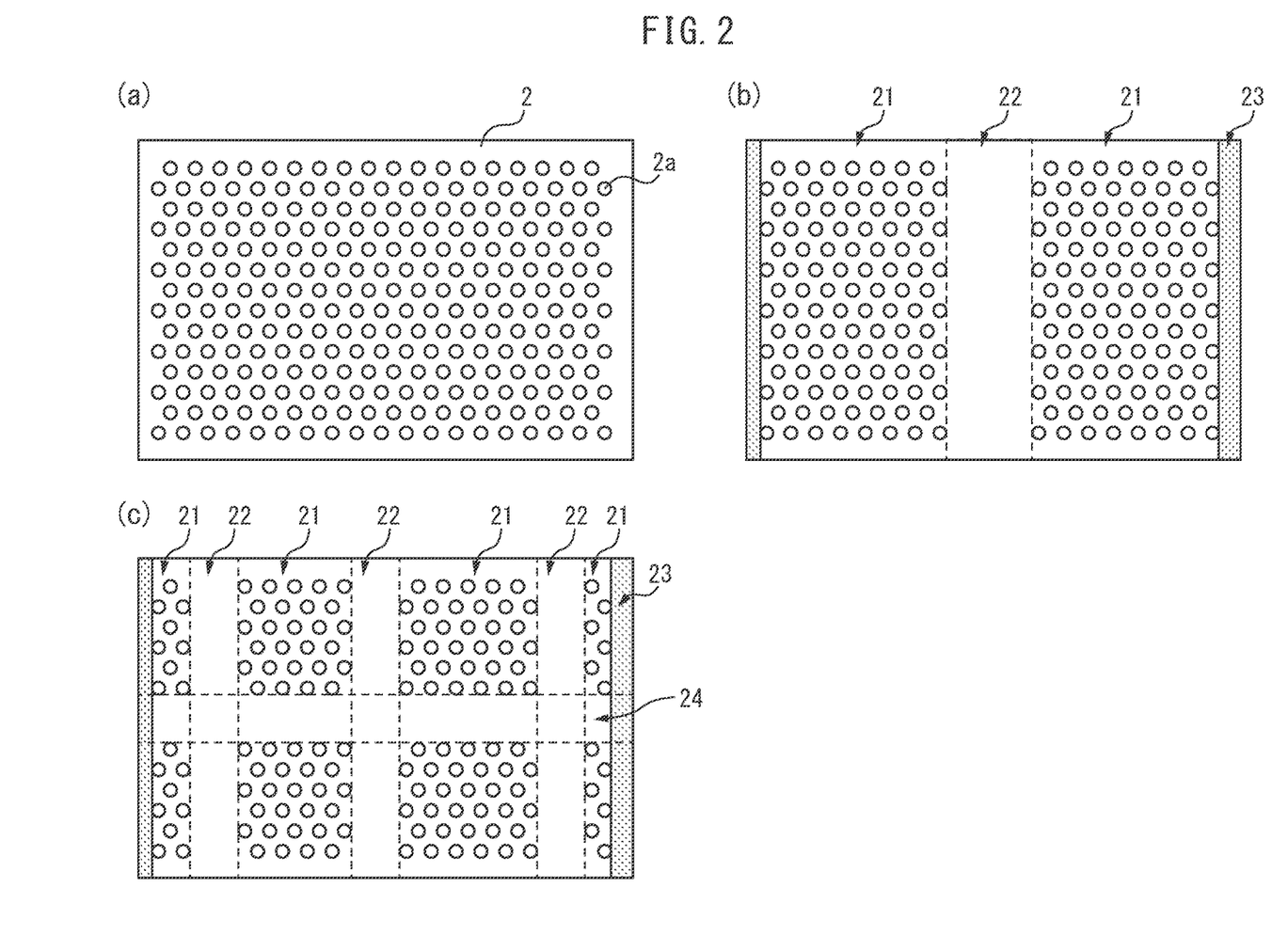

FIG. 2(a) schematically illustrates a flat foil used in a conventional perforated metal substrate. Holes are uniformly distributed throughout the flat foil.

FIG. 2(b) schematically illustrates the flat foil used in an embodiment of the perforated metal substrate of the present invention. The flat foil (2) has a perforated portion (21) and a non-perforated portion (22). When the flat foil is made into a cylindrical form, the perforated portion (21) becomes the axially perforated portion (21) having holes throughout the axial direction of the cylindrical form, and the non-perforated portion (22) becomes the axially non-perforated portion (22) having no holes throughout the axial direction of the cylindrical form. End portions (23) without holes are present at both ends in the circumferential direction of the flat foil. However, such end portions (23) may or may not be present and do not correspond to the non-perforated portions of the present specification.

FIG. 2(c) schematically illustrates the flat foil used in another embodiment of the perforated metal substrate of the present invention. The flat foil (2) has a plurality of axially perforated portions (21) and a plurality of axially non-perforated portions (22). The flat foil (2) also has a circumferentially non-perforated portion present throughout the circumferential direction.

As used in the present specification, the term "perforated portion" refers to a rectangular region or a trapezoidal region in which there are a plurality of holes adjacent to each other. As shown in FIGS. 2(b) and (c), the outer edge of the "perforated portion" passes through the outer perimeter of the plurality of holes present on the outermost side of the region. When the holes are substantially regularly distributed, whether or not the holes are "adjacent" is determined based on the regularity thereof. When the holes are not regularly distributed, the non-perforated portion is a region in which holes are absent throughout the axial direction of the cylindrical form. The perforated portion is a portion of the entirety of the foil other than the non-perforated portion and end portion. In all regions of the perforated portion, holes may be present anywhere in the axial direction of the cylindrical form. In some regions of the perforated portion, there may be no holes throughout the axial direction of the cylindrical form.

In the present specification, the dimensions of the corrugated foil refer to the dimensions if the corrugated foil is extended to be flat. Further, in the present specification, any features described herein apply to both of the flat foil and corrugated foil unless specified otherwise.

The width (length of the cylindrical form in the circumferential direction) of an axially non-perforated portion and the width of an axially perforated portion can be 2 times, 5 times, or 10 times or greater the average diameter of the holes in the substrate. Specifically, the width of each of the axially non-perforated portion and axially perforated portion can be 3.0 mm or greater, 5.0 mm or greater, 10 mm or greater, or 15 mm or greater, and can be 80 mm or less, 50 mm or less, 40 mm or less, 30 mm or less, 20 mm or less, 15 mm or less, or 10 mm or less. For example, the width of each of the axially non-perforated portion and axially perforated portion can be 5.0 mm to 80 mm or 10 mm to 50 mm.

The axially non-perforated portion may be absent from one of the flat foil and corrugated foil. The larger the axially non-perforated portion, the lower the purification performance tends to be. However, the present inventors have discovered that when the axially non-perforated portion is present in only one of the flat foil and corrugated foil, the purification performance does not decrease significantly. When the axially non-perforated portion and axially perforated portion are present on both of the flat foil and corrugated foil, the area ratio (area of axially non-perforated portion or axially perforated portion with respect to the total area of the foil) of each of the axially non-perforated portion and axially perforated portion can be 10% or greater, 20% or greater, 30% or greater, 40% or greater, or 50% or greater, and can be 80% or less, 70% or less, 60% or less, or 50% or less. For example, the area ratio of each of the axially non-perforated portion and axially perforated portion can be 10% to 80%, 20% to 70%, or 30% to 60%.

The present inventors have discovered that the area ratio of the axially non-perforated portion of the corrugated foil exerts a greater influence on the mechanical strength of the metal substrate than the area ratio of the axially non-perforated portion of the flat foil. It is preferable that the area ratio of the axially non-perforated portion of the corrugated foil be greater than the area ratio of the axially non-perforated portion of the flat foil, from the viewpoint of mechanical strength. For example, it is preferable that the area ratio of the axially non-perforated portion of the corrugated foil be 10% to 80% or 15 to 50%, the area ratio of the axially non-perforated portion of the flat foil be 0% to 50% or 0 to 30%, and the area ratio of the axially non-perforated portion of the corrugated foil be greater than the area ratio of the axially non-perforated portion of the flat foil, because a particularly high level of both mechanical strength and purification performance can be achieved.

The opening ratio (percentage of volume decrease due to the presence of holes) of the axially perforated portion of each of the flat foil and corrugated foil can be 20% or greater, 30% or greater, 40% or greater, 50% or greater, or 60% or greater, and can be 80% or less, 70% or less, 60% or less, 50% or less, 40% or less, or 30% or less. For example, the opening ratio of the axially perforated portion of the flat foil and corrugated foil can be 20% to 80%, 30% to 70%, or 40% to 60%.

It is preferable that an axially non-perforated portion be present on the outermost circumference of the metal substrate in a cylindrical form. When there is an axially non-perforated portion on the outermost circumference, a large joint area can be obtained in the axially non-perforated portion when joining the outer cylinder and the metal substrate, and the joint strength between the outer cylinder and the metal substrate can be increased. The outermost circumference of the metal substrate can be the corrugated foil or the flat foil.

The metal substrate of the present invention can have circumferentially non-perforated portions throughout the circumferential direction, as described in PTL 2. The width (length of the cylindrical form in the axial direction) of each of the circumferentially non-perforated portions can be 3.0 mm or greater, 5.0 mm or greater, 10 mm or greater, or 15 mm or greater, and can be 40 mm or less, 30 mm or less, 20 mm or less, 15 mm or less, or 10 mm or less. For example, the width of each of the circumferentially non-perforated portions can be 3.0 mm to 40 mm or 5 mm to 20 mm.

In the present specification, a region where an axially perforated portion present throughout the axial direction and a circumferentially non-perforated portion present throughout the circumferential direction overlap is considered as an axially perforated portion.

A more preferred embodiment of the perforated metal substrate of the present invention comprises a corrugated foil and a flat foil laminated and made into a cylindrical form and has 50 cells/inch$^2$ to 800 cells/inch$^2$. In this case, the corrugated foil has a plurality of first holes having an area 2.0 times to 50 times the average opening area of the cells, and the flat foil has a plurality of second holes having an area of 3.0 times to 100 times the average opening area of the cells. It is preferable that the average area of the first holes of the corrugated foil is smaller than the average area of the second holes of the flat foil.

In conventional exhaust gas purification devices which used perforated metal substrates, the presence of holes improved the purification performance but worsened pressure loss.

The following is considered to be the reason that the presence of holes improves purification performance.

Due to the presence of holes, the geometric surface areas of the corrugated foil and flat foil become smaller, and the contact area between the exhaust gas and the catalyst layer becomes smaller. At the same time, expansion and contraction of exhaust gas flow occur, such that the flow is disturbed near the side walls. Thus, the boundary film at the layer interface between the exhaust gas and the catalyst layer is thin, and the substance transfer rate at that interface is improved. It is considered that since the improvement in the substance transfer rate between the exhaust gas and the catalyst layer makes a stronger contribution than the decrease in the contact area between the exhaust gas and the catalyst layer, the presence of holes improves purification performance.

Further, the presence of holes enables the diffusion of exhaust gas between adjacent cells. In an internal combustion engine, there is a bias in exhaust gas flow in the radial direction due to the fact that the flow rate distribution of the exhaust gas pipe cross-section is not uniform, and as a result, exhaust gas purification is not efficient. It is considered since the presence of holes enables the diffusion of gas between adjacent cells, this bias in exhaust gas flow can be eliminated, such that exhaust gas purification performance improves.

The following is considered to be the reason that pressure loss becomes higher due to the presence of holes. Due to the presence of holes, the geometric surface areas of the corrugated foil and flat foil become smaller, and the contact area between the exhaust gas and the catalyst layer become smaller, such that the pressure loss is smaller. However, the exhaust gas flow expands, contracts, diverges, and converges in the radial direction in the purification device, such that each causes pressure loss. It is considered that since these make a greater contribution to pressure loss than the decrease in the contact area between the exhaust gas and the catalyst layer, the presence of holes increases pressure loss.

Thus, conventional exhaust gas purification devices which used perforated metal substrates faced a trade-off between pressure loss and purification performance.

In contrast, the present inventors have unexpectedly discovered that the above perforated metal substrate can provide an exhaust gas purification device which can achieve both low pressure loss and high purification performance. Without being bound to theory, this is considered to be due to the fact that the holes of the flat foil and the holes of the corrugated foil exert different influences on pressure loss and purification performance. Specifically, it is presumed that when the holes of the corrugated foil are enlarged, pressure loss is improved (lowers) and purification performance worsens, whereas when the holes of the flat foil are enlarged, the effect of improving (lowering) pressure is maintained and purification performance degradation is not significant. Thus, when the holes of the corrugated foil are small and the holes of the flat foil are large within specific area ranges, it is possible to achieve both low pressure loss and high purification performance.

The holes present in each of the corrugated foil and flat foil can all be of the same size, or can be of different sizes within the range where the effect of the present invention is obtained. It is preferable that all holes in the corrugated foil and flat foil be the first holes and the second holes, respectively. However, within the range where the advantageous effect of the present invention is obtained, it is not necessary that all of the holes present in the corrugated foil and flat foil be the above first holes and the above second holes, respectively. For example, the total area of the first holes of the corrugated foil can be 60% or greater, 70% or greater, 80% or greater, 90% or greater, or 95% or greater of the total area of all holes of the corrugated foil, and/or the total area of the second holes of the flat foil can be 60% or greater, 70% or greater, 80% or greater, 90% or greater, or 95% or greater of the total area of all holes of the flat foil.

The corrugated foil can have a plurality of first holes having an area 2.0 times to 50 times the average opening area of the cells. For example, the area of the first holes can be 3.0 $mm^2$ or greater, 4.0 $mm^2$ or greater, 5.0 $mm^2$ or greater, 10 $mm^2$ or greater, 20 $mm^2$ or greater, 50 $mm^2$ or greater, and can be 100 $mm^2$ or less, 80 $mm^2$ or less, 60 $mm^2$ or less, 40 $mm^2$ or less, or 20 $mm^2$ or less. For example, the area of the first holes can be 3.0 $mm^2$ to 100 $mm^2$ or 10 $mm^2$ to 80 $mm^2$.

The holes of the corrugated foil, either all or a portion thereof, can be round or elliptical, or can be a non-circular shape, such as a polygonal shape. The equivalent diameter of the holes of the corrugated foil and/or the equivalent diameter of the first holes of the corrugated foil can be 2.0 mm or greater, 2.5 mm or greater, 3.0 mm or greater, 4.0 mm or greater, 5.0 mm or greater, or 7.0 mm or greater, and can be 20 mm or less, 15 mm or less, 10 mm or less, 7.0 mm or less, 5.0 mm or less, or 4.0 mm or less. Equivalent diameter refers to the diameter of a perfect circle having the circumference equal to the circumference of that surface. For example, the equivalent diameter of the holes of the corrugated foil and/or the equivalent diameter of the first holes of the corrugated foil can be 2.0 mm to 20 mm or 3.0 mm to 10 mm.

The flat foil can have a plurality of second holes having an area of 3.0 times to 100 times the average opening area of the cells. For example, the area of the second holes can be 3.0 $mm^2$ or greater, 5.0 $mm^2$ or greater, 10 $mm^2$ or greater, 20 $mm^2$ or greater, 50 $mm^2$ or greater, or 100 $mm^2$ or greater, and can be 300 $mm^2$ or less, 200 $mm^2$ or less, 150 $mm^2$ or less, 100 $mm^2$ or less, 80 $mm^2$ or less, or 60 $mm^2$ or less. For example, the area of the second holes can be 10 $mm^2$ to 300 $mm^2$ or 50 $mm^2$ to 200 $mm^2$.

The holes of the flat foil, either all or a portion thereof, can be round or elliptical, or can be of a non-circular shape, such as a polygonal shape. The equivalent diameter of the holes of the flat foil and/or the equivalent diameter of the second holes of the flat foil can be 3.0 mm or greater, 3.5 mm or greater, 5.0 mm or greater, 8.0 mm or greater, 10 mm or greater, or 12 mm or greater, and can be 25 mm or less, 20 mm or less, 15 mm or less, 10 mm or less, 7.0 mm or less, or 5.0 mm or less. For example, the equivalent diameter of the holes of the flat foil and/or the equivalent diameter of the second holes of the flat foil can be 3.0 mm to 25 mm or 5.0 mm to 15 mm.

The ratio of the average value of the areas of the second holes of the flat foil to the average value of the areas of the first holes of the corrugated foil (average value of areas of first holes/average value of areas of second holes) can be greater than 1.0, for example, 1.2 or greater, 1.5 or greater, 2.0 or greater, 3.0 or greater, or 5.0 or greater, and can be 15 or less, 10 or less, 8.0 or less, 6.0 or less, 4.0 or less, or 3.0 or less. For example, this ratio can be greater than 1.0 to 15 or 1.5 to 6.0.

Depending on the size of the holes and the sizes of the non-perforated portion and perforated portion, within the range where the advantageous effect of the present invention is obtained, the pitch (distance between the centers of adjacent holes) of adjacent holes in the axial direction of the cylindrical metal substrate can be, for holes in each of the flat foil and corrugated foil, 5.0 mm or greater, 6.0 mm or greater, 8.0 mm or greater, 10.0 mm or greater, 12 mm or greater, or 15 mm or greater, and can be 25 mm or less, 20 mm or less, 15 mm or less, 10 mm or less, 7.0 mm or less, or 5.0 mm or less.

Depending on the size of the holes and the sizes of the non-perforated portion and perforated portion, the pitch of adjacent holes in the circumferential direction of the cylindrical metal substrate can be, for holes in each of the flat foil and corrugated foil, 5.0 mm or greater, 6.0 mm or greater, 8.0 mm or greater, 10.0 mm or greater, 12 mm or greater, or 15 mm or greater, and can be 25 mm or less, 20 mm or less, 15 mm or less, 10 mm or less, 7.0 mm or less, or 5.0 mm or less.

The opening ratio of each of the flat foil and corrugated foil can be 10% or greater, 20% or greater, 30% or greater, 40% or greater, 50% or greater, or 60% or greater, and can be 70% or less, 60% or less, 50% or less, 40% or less, or 30% or less.

The metal substrate of the present invention has 50 cells/inch to 800 cells/inch. For example, there can be 80 cells/$inch^2$ or more, 100 cells/$inch^2$ or more, 150 cells/$inch^2$ or more, 200 cells/$inch^2$ or more, or 300 cells/$inch^2$ or more, and can be 600 cells/$inch^2$ or fewer, 400 cells/$inch^2$ or fewer, 300 cells/$inch^2$ or fewer, or 200 cells/$inch^2$ or fewer.

The average opening area of the cells can be calculated by the above number of cells, and can be 0.50 $mm^2$ or greater, 0.80 $mm^2$ or greater, 1.0 $mm^2$ or greater, 1.5 $mm^2$ or greater, 2.0 $mm^2$ or greater, 3.0 $mm^2$ or greater, or 5.0 $mm^2$ or greater, and can be 13 $mm^2$ or less, 10 $mm^2$ or less, 7.0 $mm^2$ or less, 5.0 $mm^2$ or less, 3.5 $mm^2$ or less, or 2.0 $mm^2$ or less.

The metal substrate of the present invention is a cylinder in which corrugated foil and flat foil are laminated. The metal substrate of the present invention can be a cylindrical body formed by simply rolling one laminated body of a corrugated foil and a flat foil or a plurality of laminated bodies, or can be, as described in PTL 1, a cylindrical body formed by rolling a plurality of laminated bodies in an S-shape.

The wavelike form of the corrugated foil used in the metal substrate of the present invention is not limited to the wavelike form as illustrated in FIG. 4, but can be formed in omega-curve or zig-zag form.

The thickness of each of the corrugated foil and flat foil is not particularly limited, but can be 20 μm or greater, 40 μm or greater, 80 μm or greater, or 100 μm or greater, and can be 500 μm or less, 300 μm or less, 200 μm or less, 100 μm or less, or 80 μm or less.

The holes can be made by punching the entirety of the metal foil using a punching machine such that the desired opening ratio is achieved. The shape of the holes is not particularly limited.

The metal substrate of the present invention can have an optional outer cylinder. The cylindrical corrugated foil and flat foil can be placed in the interior of the outer cylinder, and can be joined thereto by means such as brazing.

The method for manufacturing the metal substrate of the present invention can include punching a metal foil using a punching machine to obtain the flat foil above; corrugation-processing a flat foil to obtain the corrugated foil above; and laminating the flat foil and corrugated foil and forming a cylinder thereof. This method can optionally include inserting the cylinder of the corrugated foil and flat foil into an outer cylinder and securing thereto.

The exhaust gas purification device of the present invention includes the above perforated metal substrate and a catalyst layer formed on the above perforated metal substrate. The catalyst layer can have a configuration known in the field as a catalyst layer having exhaust gas purification performance. For example, the catalyst layer can have a metal oxide support provided on the surface of a metal substrate and a noble metal supported on the support.

The metal oxide support can be, for example, ceria, zirconia, alumina, a rare earth metal oxide, or a composite oxide consisting of a plurality thereof.

The noble metal can be, for example, platinum, palladium, or rhodium. These noble metals can be supported on the metal oxide support as particles with a particle size of, for example, 1 nm to 100 nm.

The method for manufacturing the exhaust gas purification device of the present invention can include providing the above perforated metal substrate; forming a layer of a metal oxide support on the above perforated metal substrate; and supporting a noble metal on the metal oxide support.

The step of forming a layer of a metal oxide support on the perforated metal substrate can include, for example, preparing a solution or slurry containing at least one selected from metal oxides and/or precursors thereof, coating the perforated metal substrate with the solution or slurry, and optionally firing the perforated metal substrate.

The step of supporting a noble metal on a metal oxide support can include impregnating a layer of the metal oxide support with a solution containing a noble metal precursor and firing the metal oxide support. Alternatively, a noble metal can be supported, in advance, on the metal oxide and/or a precursor thereof in the solution or slurry used to coat the perforated metal substrate.

The exhaust gas purification device of the present invention can be used as an exhaust gas purification device in an internal combustion engine for motorcycles, power generators, and agricultural machinery.

The present invention will be specifically described by way of the following Examples. However, the present invention is not limited thereto.

EXAMPLES

<<Test A: Test Regarding Metal Substrates Using Foils Having Perforated and Non-Perforated Portions>>

Figure 5:
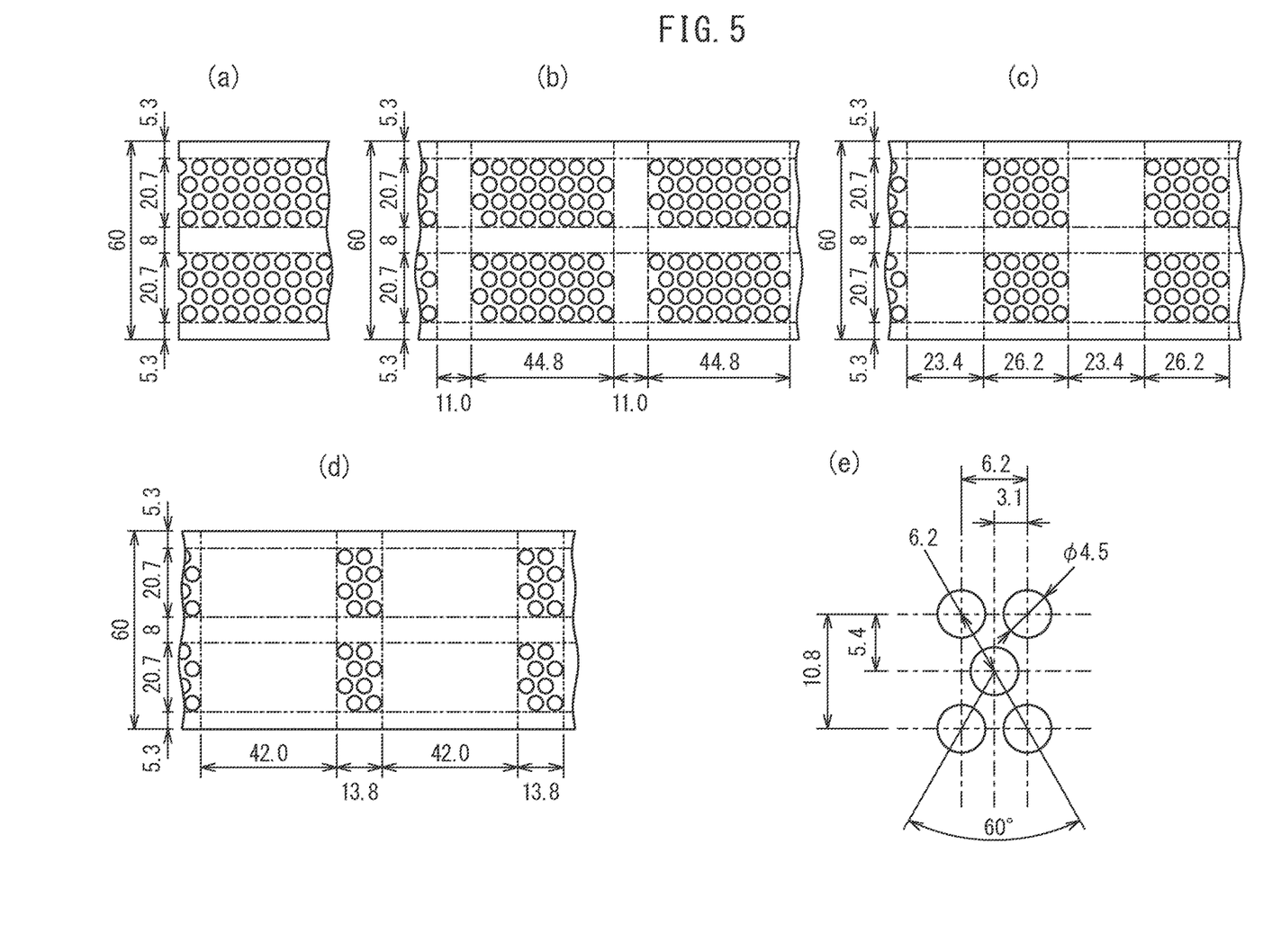
FIG. 5 illustrates holes of a foil used in the Examples.

As shown in FIGS. 5(a) to (d), foil A (FIG. 5(a)) having an area ratio of an axially non-perforated portion of 0%, foil B (FIG. 5(b)) having 20%, foil C (FIG. 5(c)) having 47%, and foil D (FIG. 5(d)) having 75% were prepared. These foils were made of 20Cr-5Al stainless steel and had a thickness of 50 μm. As shown in FIG. 5(e), the punched holes had a diameter of 4.5 mm, a hole pitch of 6.2 mm, and a 60° staggered hole arrangement.

Figure 6:
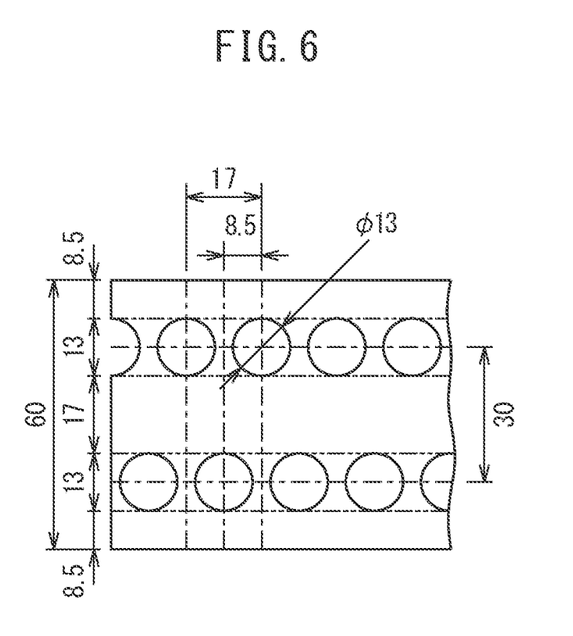
FIG. 6 illustrates holes of a foil used in the Examples.

As shown in FIG. 6, foil E having an area ratio of an axially non-perforated portion of 0% was also manufactured.

Using these foils A to E, various corrugated foils and flat foils were manufactured. These corrugated foils and flat foils were then laminated to manufacture perforated metal substrates in a cylindrical form having a diameter of 40 mm, a length of 60 mm, and 400 cells/inch (average opening area of cells: about 1.6 mm$^2$).

A load was applied to each of these perforated metal substrates from one end surface by an Amsler testing machine, and the buckling strength of each substrate was measured. The results are shown in Table 1.

A catalyst layer was formed on each of these perforated metal substrates under the same conditions, and the same exhaust gas purification performance test was carried out. Table 1 shows the NOx emission of each example when the NOx emission of Comparative Example 1 was set to "1".

TABLE 1

| | Area ratio of non-perforated portion (Foil type) | | Buckling strength | NOx emission |
|---|---|---|---|---|
| | Corrugated foil | Flat foil | [kN] | [-] |
| Example 1 | 20% (B) | 20% (B) | 10.9 | n.d. |
| Example 2 | 47% (C) | 47% (C) | 24.2 | 1.15 |
| Example 3 | 75% (D) | 75% (D) | 38.7 | 1.18 |
| Example 4 | 0% (A) | 20% (B) | 3.9 | 0.98 |
| Example 5 | 20% (B) | 0% (A) | 9.6 | 0.99 |
| Example 6 | 20% (B) | 0% (E) | 9.2 | 1.07 |
| Example 7 | 47% (C) | 0% (E) | 19.8 | n.d. |
| Example 8 | 75% (D) | 0% (E) | 31.2 | n.d. |
| Comparative Example 1 | 0% (A) | 0% (A) | 2.3 | 1 |
| Comparative Example 2 | 0% (A) | 0% (E) | 2.0 | 1.05 |

The metal substrates of Comparative Examples 1 and 2 each formed of a corrugated foil and a flat foil having no axially non-perforated portion, have a low buckling strength. At this level of buckling strength, deformation occurs in the axial direction when high pressure exhaust gas is continuously received for a long period of time. Conversely, the metal substrates of Examples 1 to 3 have a very high buckling strength and thus have sufficient mechanical durability. From the comparison between the metal substrates of Examples 4 and 5, it was found that, of the corrugated foil and the flat foil, the non-perforated portion of the corrugated foil exerts a greater influence on mechanical strength.

In Examples 4 to 6, which have a non-perforated portion in one of the corrugated foil and flat foil, no substantial decrease in purification performance was observed as compared to Comparative Example 1. In Examples 2 and 3, which have a non-perforated portion in both of the corrugated foil and flat foil, purification performance decreased as compared to Comparative Example 1 but was within an acceptable range.

<<Test B: Reference Test in Case of Difference in Hole Sizes Between Corrugated Foil and Flat Foil>>

Perforated metal substrates having 300 cells/inch$^2$ (average opening area of the cells: about 2 mm$^2$) using the corrugated foil and flat foil having the holes indicated in Table 2 below were manufactured. Identical catalyst layers were formed on these perforated metal substrates to manufacture exhaust gas purification devices of Reference Examples 1 to 3 and Comparative Reference Examples 1 to 9. For Comparative Reference Examples 1 to 5 (Group A), the holes of the corrugated foil and the holes of the flat foil had the same size. For Comparative Reference Examples 6 and 7 (Group B), the holes of the corrugated foil were larger than the holes of the flat foil. For Comparative Reference Examples 8 and 9 (Group C), the holes of the corrugated foil were smaller than the holes of the flat foil, but the holes of the corrugated foil were slightly larger than the cell opening size. The holes of the corrugated foil and the holes of the flat foil were round and had the same size in each foil. The opening ratio of each of the corrugated foil and flat foil was 50%.

Perforated metal substrates having 100 cells/inch$^2$ (average opening area of the cells: about 6.5 mm$^2$) using the corrugated foil and flat foil having the holes indicated in Table 3 were manufactured. Identical catalyst layers were formed on these perforated substrates to manufacture the exhaust gas purification devices of Reference Examples 4 and 5 and Comparative Reference Examples 10 to 12. The holes of the corrugated foil and the flat foil were round and had the same size in each foil. The opening ratio of each of the corrugated foil and flat foil was 50%.

These exhaust gas purification devices were installed onto a 125-cc scooter, and were evaluated in terms of exhaust gas purification performance based on the NOx emission in accordance with the "WMTC Stage 2 class 1" mode.

These exhaust gas purification devices were open to the atmosphere on one end and depressurized by a negative pressure pump on the other end. The pressure loss for the case of a flow of a stipulated air flow amount was measured at room temperature. The space velocity (SV) in this case was 450,000 [l/h].

Figure 7:
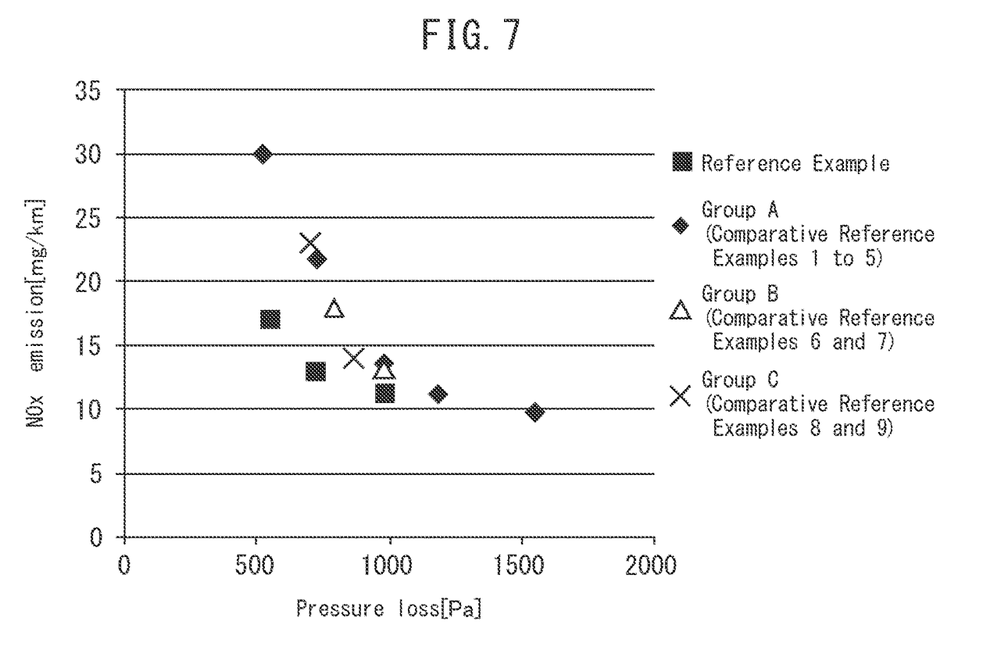
FIG. 7 represents pressure loss and purification performance of the Reference Examples and Comparative Reference Examples which used cells of 300 cells/inch$^2$.
Figure 8:
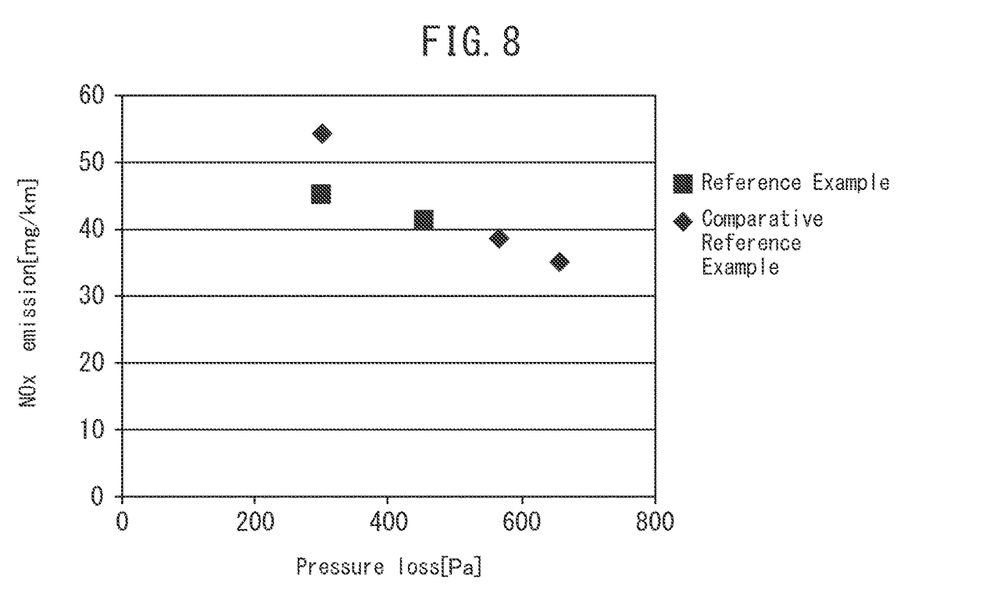
FIG. 8 represents pressure loss and purification performance of the Reference Examples and Comparative Reference Examples which used cells of 100 cells/inch$^2$.

The results are shown in Table 2, Table 3, FIG. 7, and FIG. 8. With reference to FIG. 7 and FIG. 8, it is clear that the exhaust gas purification devices according to the Reference Examples are able to achieve both low pressure loss and low NOx emission (high purification performance). A person skilled in the art can understand that even in the metal substrate of the present invention having non-perforated and perforated portions, when there is a difference in hole sizes between the corrugated foil and the flat foil, the same results as in the reference test can be obtained.

TABLE 2

Case with 300 cells/inch$^2$ (average opening area: about 2 mm$^2$)

| | Corrugated foil | | Flat foil | | | Results | |
|---|---|---|---|---|---|---|---|
| | | Hole | | Hole | | | |
| | Hole area [mm$^2$] | area/cell opening area | Hole area [mm$^2$] | area/cell opening area | Flat foil hole area/corrugated foil hole area | Pressure loss [Pa] | NOx [mg/km] |
| Ref. Ex. 1 | 4.5 | 2.3 | 10.2 | 5.1 | 2.3 | 987 | 11.2 |
| Ref. Ex. 2 | 15.9 | 8.0 | 133 | 66.5 | 8.4 | 727 | 12.9 |
| Ref. Ex. 3 | 50.3 | 25.2 | 154 | 77.0 | 3.1 | 554 | 17.0 |
| Comp. Ref. Ex. 1 | 0.8 | 0.4 | 0.8 | 0.4 | 1.0 | 1550 | 9.8 |
| Comp. Ref. Ex. 2 | 4.5 | 2.3 | 4.5 | 2.3 | 1.0 | 1185 | 11.1 |
| Comp. Ref. Ex. 3 | 15.9 | 8.0 | 15.9 | 8.0 | 1.0 | 976 | 13.5 |
| Comp. Ref. Ex. 4 | 50.3 | 25.2 | 50.3 | 25.2 | 1.0 | 723 | 21.8 |
| Comp. Ref. Ex. 5 | 133 | 66.5 | 133 | 66.5 | 1.0 | 521 | 30.0 |
| Comp. Ref. Ex. 6 | 10.2 | 5.1 | 4.5 | 2.3 | 0.4 | 981 | 13.1 |
| Comp. Ref. Ex. 7 | 133 | 66.5 | 15.9 | 8.0 | 0.1 | 790 | 17.9 |
| Comp. Ref. Ex. 8 | 3.1 | 1.6 | 10.2 | 5.1 | 3.3 | 864 | 14.0 |
| Comp. Ref. Ex. 9 | 3.1 | 1.6 | 133 | 66.5 | 42.9 | 698 | 23.1 |

TABLE 3

Case with 100 cells/inch$^2$ (average opening area of cells: about 6.5 mm$^2$)

| | Corrugated foil | | Flat foil | | | Results | |
|---|---|---|---|---|---|---|---|
| | | Hole | | Hole | | | |
| | Hole area [mm$^2$] | area/cell opening area | Hole area [mm$^2$] | area/cell opening area | Flat foil hole area/corrugated foil hole area | Pressure loss [Pa] | NOx [mg/km] |
| Ref. Ex. 4 | 15.9 | 2.4 | 133 | 20.5 | 8.4 | 453 | 41.5 |
| Ref. Ex. 5 | 50.3 | 7.7 | 154 | 23.7 | 3.1 | 301 | 45.3 |
| Comp. Ref. Ex. 10 | 4.5 | 0.7 | 10.2 | 1.6 | 2.3 | 659 | 35.2 |
| Comp. Ref. Ex. 11 | 15.9 | 2.4 | 15.9 | 2.4 | 1.0 | 566 | 38.6 |
| Comp. Ref. Ex. 12 | 133 | 20.5 | 133 | 20.5 | 1.0 | 302 | 54.3 |

REFERENCE SIGNS LIST 10 metal substrate
1 corrugated foil
1a first holes
11 axially perforated portion
12 axially non-perforated portion
2 flat foil
2a second holes
21 axially perforated portion
22 axially non-perforated portion
23 end portion
24 circumferentially non-perforated portion
3 cells
4 outer cylinder

The invention claimed is:

1. A perforated metal substrate for exhaust gas purification in which a corrugated foil having holes and a flat foil having holes are laminated and made into a cylindrical form, wherein
the corrugated foil and/or the flat foil comprises an axially perforated portion having holes throughout the axial direction of the cylindrical form and an axially non-perforated portion having no holes throughout the axial direction of the cylindrical form,
a width of the axially non-perforated portion is 2 times or greater than an average diameter of the holes in the substrate, and
end portions without holes are present at both ends in a circumferential direction of the corrugated foil and/or the flat foil and the end portions do not correspond to the axially non-perforated portion.

2. The perforated metal substrate according to claim 1, wherein the axially non-perforated portion of the corrugated foil and/or the flat foil has an area ratio of 10% to 80%.

3. The perforated metal substrate according to claim 1, wherein the axially perforated portion of the corrugated foil and/or the flat foil has an opening ratio of 20 to 80%.

4. The perforated metal substrate according to claim 1, wherein
the corrugated foil and the flat foil comprise the axially perforated portion and the axially non-perforated portion,
the axially non-perforated portion of each of the corrugated foil and the flat foil has an area ratio of 20% to 70%, and
the axially perforated portion has an opening ratio of 20 to 80%.

5. An exhaust gas purification device, comprising
the perforated metal substrate according to claim 4, and
a catalyst layer formed on the perforated metal substrate.

6. The exhaust gas purification device according to claim 5, wherein the perforated metal substrate is inserted into an outer cylinder.

7. The perforated metal substrate according to claim 1, wherein the area ratio of the axially non-perforated portion of the corrugated foil is greater than the area ratio of the axially non-perforated portion of the flat foil.

8. The perforated metal substrate according to claim 1, wherein the axially non-perforated portion is present in the outermost circumference of the cylindrical form.

9. The perforated metal substrate according to claim 1, wherein a circumferentially non-perforated portion having no holes throughout the circumferential direction of the corrugated foil and/or the flat foil is present.

10. The perforated metal substrate according to claim 1, wherein
the perforated metal substrate has 50 cells/inch$^2$ to 800 cells/inch$^2$,
the corrugated foil has a plurality of first holes having an area 2.0 times to 50 times the average opening area of the cells,
the flat foil has a plurality of second holes having an area 3.0 times to 100 times the average opening area of the cells, and
the average value of the areas of the first holes of the corrugated foil is smaller than the average value of the areas of the second holes of the flat foil.

11. The perforated metal substrate according to claim 10, wherein at least one of the following conditions (1) and (2) is satisfied:
(1) the total area of the first holes of the corrugated foil is 60% or greater of the total area of all holes in the corrugated foil, and
(2) the total area of the second holes of the flat foil is 60% or greater of the total area of all holes in the flat foil.

12. An exhaust gas purification device, comprising
the perforated metal substrate according to claim 10, and
a catalyst layer formed on the perforated metal substrate.

13. The exhaust gas purification device according to claim 12, wherein the perforated metal substrate is inserted into an outer cylinder.

14. An exhaust gas purification device, comprising
the perforated metal substrate according to claim 1, and
a catalyst layer formed on the perforated metal substrate.

15. The exhaust gas purification device according to claim 14, wherein the perforated metal substrate is inserted into an outer cylinder.

* * * * *